(12) United States Patent
Nakano et al.

(10) Patent No.: US 11,092,271 B2
(45) Date of Patent: Aug. 17, 2021

(54) FLEXIBLE CONNECTION PIPE FOR CRYOCOOLER AND CRYOCOOLER

(71) Applicant: SUMITOMO HEAVY INDUSTRIES, LTD., Tokyo (JP)

(72) Inventors: Kyosuke Nakano, Tokyo (JP); Yoshikatsu Hiratsuka, Tokyo (JP); Kenta Yumoto, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 505 days.

(21) Appl. No.: 15/953,078

(22) Filed: Apr. 13, 2018

(65) Prior Publication Data
US 2018/0231164 A1    Aug. 16, 2018

Related U.S. Application Data

(63) Continuation of application No. PCT/JP2016/081477, filed on Oct. 24, 2016.

(30) Foreign Application Priority Data

Oct. 23, 2015 (JP) .............................. JP2015-208612

(51) Int. Cl.
*F16L 11/11* (2006.01)
*F16L 33/24* (2006.01)
(Continued)

(52) U.S. Cl.
CPC ............. *F16L 33/035* (2013.01); *F16L 11/11* (2013.01); *F16L 11/20* (2013.01); *F16L 33/24* (2013.01); *F25B 41/40* (2021.01); *F25B 9/00* (2013.01)

(58) Field of Classification Search
CPC .......... F16L 33/035; F16L 11/11; F16L 11/20; F16L 33/24; F16L 39/02; F16L 25/0036
(Continued)

(56) References Cited

U.S. PATENT DOCUMENTS

| 149,438 A * | 4/1874 | Callahan ............... F16L 33/222 |
| | | 285/250 |
| 1,588,605 A * | 6/1926 | Oden ...................... F16L 33/24 |
| | | 285/40 |

(Continued)

FOREIGN PATENT DOCUMENTS

| JP | S59-019670 U | 2/1984 |
| JP | S61-171178 A | 8/1986 |

(Continued)

OTHER PUBLICATIONS

International Search Report issued in Application No. PCT/JP2016/081477, dated Jan. 24, 2017.

*Primary Examiner* — Matthew Troutman
*Assistant Examiner* — Fannie C Kee
(74) *Attorney, Agent, or Firm* — Michael Best & Friedrich LLP

(57) ABSTRACT

A flexible connection pipe for a cryocooler includes a connection hose that includes a flexible pipe which is provided with a pipe end portion and a flexible tube which is provided with a tube end portion coming into close contact with the pipe end portion and which is inserted into the flexible pipe and a connection adapter that connects the connection hose to a constituent element of the cryocooler, the connection adapter being adjacent to the tube end portion and being fixed to the pipe end portion.

11 Claims, 8 Drawing Sheets

(51) Int. Cl.
 *F16L 11/20* (2006.01)
 *F16L 33/035* (2006.01)
 *F25B 41/40* (2021.01)
 *F25B 9/00* (2006.01)

(58) Field of Classification Search
 USPC .......................................................... 285/259
 See application file for complete search history.

(56) References Cited

U.S. PATENT DOCUMENTS

| | | | | |
|---|---|---|---|---|
| 1,915,041 A | * | 6/1933 | Wallace | F16L 33/26 285/258 |
| 2,300,547 A | * | 11/1942 | Guarnaschelli | F16L 11/20 285/121.1 |
| 3,237,974 A | * | 3/1966 | Press | F16L 33/2073 285/222.4 |
| 5,535,593 A | * | 7/1996 | Wu | F25B 9/14 62/228.5 |
| 6,536,218 B1 | * | 3/2003 | Steinmeyer | H01F 6/065 62/6 |

FOREIGN PATENT DOCUMENTS

| | | |
|---|---|---|
| JP | 2002-333224 A | 11/2002 |
| JP | 2002-340236 A | 11/2002 |

* cited by examiner

FLEXIBLE CONNECTION PIPE FOR CRYOCOOLER AND CRYOCOOLER

RELATED APPLICATIONS

Priority is claimed to Japanese Patent Application No. 2015-208612, filed Oct. 23, 2015, and International Patent Application No. PCT/JPA2016/081477, the entire content of each of which is incorporated herein by reference.

BACKGROUND

Technical Field

Certain embodiments of the present invention relates to a flexible connection pipe for a cryocooler and a cryocooler including the flexible connection pipe.

Description of Related Art

In a cryocooler in the related art, one constituent element and another constituent element (for example, compressor and expander) are connected to each other by a rigid pipe. Such a configuration is effective in reducing a pressure drop in a connection pipe. However, since it is difficult to change the shape of the rigid pipe, it is difficult to freely change relative positions of the constituent elements. Therefore, there is a limit on an installation layout at a place where the cryocooler is used. Accordingly, using a flexible pipe for the cryocooler in order to increase the degree of freedom in installation has been suggested. The flexible pipe is also effective for reducing vibration transmitted between the constituent elements of the cryocooler.

SUMMARY

According to an aspect of the invention, a flexible connection pipe for a cryocooler includes a connection hose that includes a flexible pipe which is provided with a pipe end portion and a flexible tube which is provided with a tube end portion coming into close contact with the pipe end portion and which is inserted into the flexible pipe and a connection adapter that connects the connection hose to a constituent element of the cryocooler, the connection adapter being adjacent to the tube end portion and being fixed to the pipe end portion.

According to another aspect of the invention, a cryocooler includes a compressor, an expander that is disposed to be separated from the compressor, and a flexible connection pipe that connects the compressor to the expander. The flexible connection pipe includes a connection hose that includes a flexible pipe and a flexible tube, the flexible pipe being provided with a first pipe end portion and a second pipe end portion, the flexible tube being provided with a first tube end portion and a second tube end portion respectively coming into close contact with the first pipe end portion and the second pipe end portion and being inserted into the flexible pipe, a first connection adapter that connects the connection hose to the compressor, the first connection adapter being adjacent to the first tube end portion and being fixed to the first pipe end portion, and a second connection adapter that connects the connection hose to the expander, the second connection adapter being adjacent to the second tube end portion and being fixed to the second pipe end portion.

According to still another aspect of the invention, a cryocooler includes a cold head, a valve unit that is disposed to be separated from the cold head, and a flexible connection pipe that connects the cold head to the valve unit. The flexible connection pipe includes a connection hose that includes a flexible pipe and a flexible tube, the flexible pipe being provided with a first pipe end portion and a second pipe end portion, the flexible tube being provided with a first tube end portion and a second tube end portion respectively coming into close contact with the first pipe end portion and the second pipe end portion and being inserted into the flexible pipe, a first connection adapter that connects the connection hose to the cold head, the first connection adapter being adjacent to the first tube end portion and being fixed to the first pipe end portion, and a second connection adapter that connects the connection hose to the valve unit, the second connection adapter being adjacent to the second tube end portion and being fixed to the second pipe end portion.

DETAILED DESCRIPTION

Figure 1:
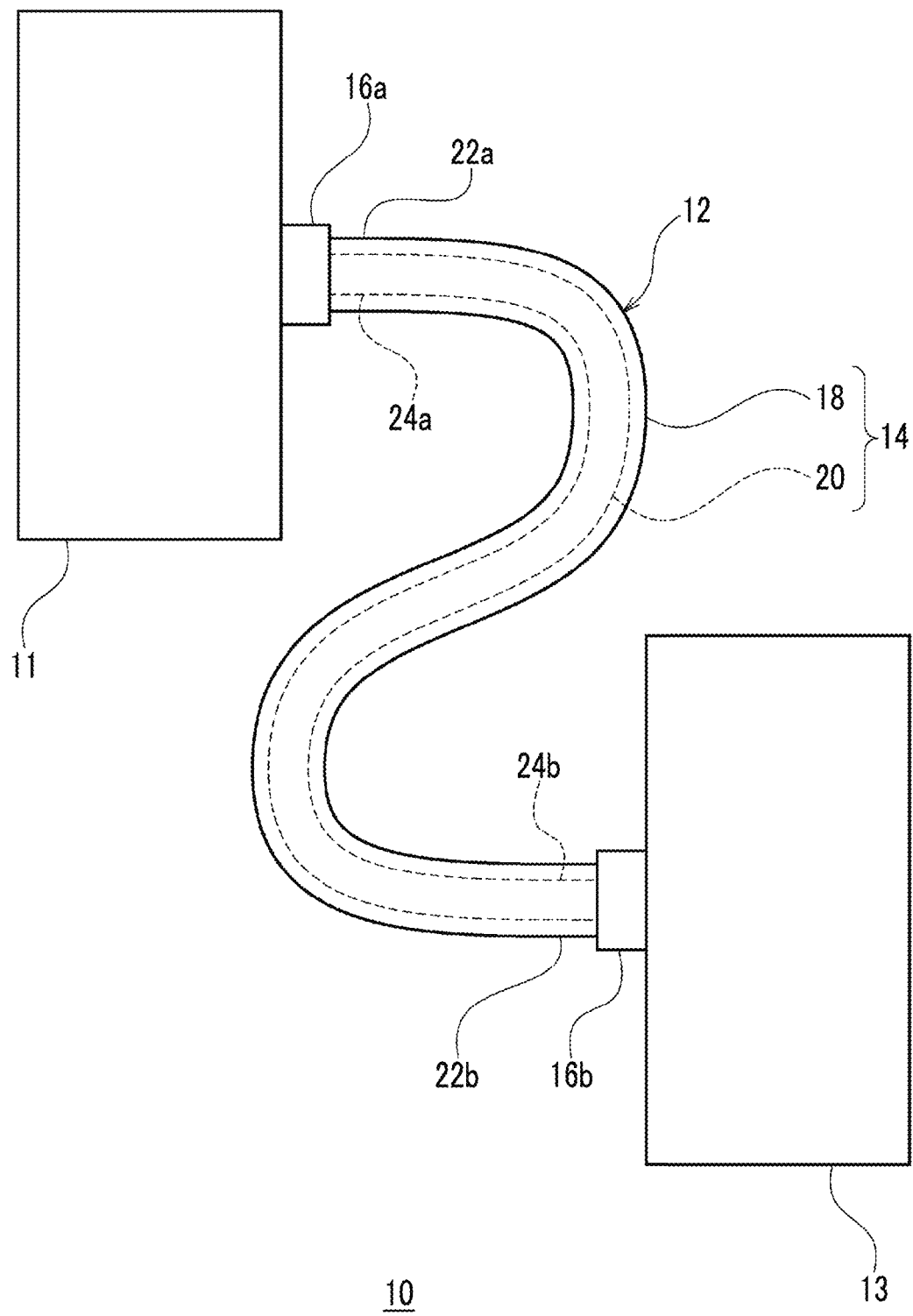
FIG. 1 is a view schematically illustrating the entire configuration of a cryocooler according to an embodiment of the invention.

A flexible pipe in a certain suggestion has a single-pipe structure provided with a bellows-shaped uneven inner surface. However, such unevenness may result in a large in-pipe pressure drop. An increase in pressure drop may result in a decrease in performance of a cryocooler. Therefore, a flexible pipe in another suggestion may have a double-pipe structure including an outer pipe that is provided with a bellows-shaped uneven inner surface and an inner pipe that is inserted into the outer pipe and that covers the uneven surface. The double-pipe structure is effective for reducing a pressure drop in a connection pipe.

As a result of intensive research on applying a flexible pipe having a double-pipe structure for a cryocooler, the present inventors have recognized that the double-pipe structure may result in a decrease in performance of the cryocooler in comparison with a rigid pipe.

It is desirable to provide a flexible connection pipe for a cryocooler which prevents or alleviates a decrease in performance of a cryocooler.

Note that, arbitrary combinations of the above constituent elements, and those obtained by substituting the constituent elements or expressions in the embodiments of the invention with each other between methods, devices, systems, or the like are also effective as an aspect of the invention.

According to an embodiment of the invention, it is possible to provide a flexible connection pipe for a cryocooler which prevents or alleviates a decrease in performance of a cryocooler.

Hereinafter, embodiments of the invention will be described in detail with reference to drawings. Note that, the same reference numerals are assigned to the same elements and repetitive descriptions thereof will be omitted in the description. In addition, configurations described below are merely an example and do not limit the scope of the invention.

FIG. 1 is a view schematically illustrating the entire configuration of a cryocooler 10 according to an embodiment of the invention. The cryocooler 10 is provided with a compressor 11, a flexible connection pipe 12, and an expander 13. The compressor 11 is disposed to be separated from the expander 13. The flexible connection pipe 12 connects a working gas chamber of the compressor 11 to a working gas chamber of the expander 13. The flexible connection pipe 12 provides a gas flow path through which a working gas flows between the compressor 11 and the expander 13. The working gas is, for example, a helium gas. The flexible connection pipe 12 can connect the compressor 11 to the expander 13 in a state of being curved in an arbitrary shape.

The cryocooler 10 is, for example, a split-stirling cryocooler. In this case, the compressor 11 generates pressure vibration of the working gas. The pressure vibration is transmitted to the expander 13 through the flexible connection pipe 12. Pressure vibration having a same frequency as the pressure vibration of the compressor 11 is driven to the expander 13. A reverse stirling cycle is formed between the compressor 11 and the expander 13. In this manner, the expander 13 generates coldness.

The flexible connection pipe 12 is provided with a connection hose 14, a first connection adapter 16a for connecting the connection hose 14 to the compressor 11, and a second connection adapter 16b for connecting the connection hose 14 to the expander 13. The connection hose 14 is provided with a flexible pipe 18 and a flexible tube 20 inserted into the flexible pipe 18. Since the flexible tube 20 is accommodated in the flexible pipe 18, for convenience of explanation, the flexible tube 20 is illustrated by using broken lines in FIG. 1.

The flexible pipe 18 may be, for example, a flexible hose with a bellows-shaped inner wall surface, which is formed of stainless steel. An outer surface of the flexible pipe 18 may be covered with a flexible covering material. The flexible tube 20 may be a tube which is formed of a flexible material such as silicone resin.

The flexible pipe 18 is provided with a first pipe end portion 22a and a second pipe end portion 22b. The flexible tube 20 is provided with a first tube end portion 24a and a second tube end portion 24b. The first connection adapter 16a is fixed to the first pipe end portion 22a and the second connection adapter 16b is fixed to the second pipe end portion 22b. The first connection adapter 16a is disposed to be adjacent to the first tube end portion 24a and the second connection adapter 16b is disposed to be adjacent to the second tube end portion 24b.

Although detailed description will be made later, the first tube end portion 24a and the second tube end portion 24b come into close contact with the first pipe end portion 22a and the second pipe end portion 22b, respectively. Note that, the first tube end portion 24a may be permanently fixed to the first pipe end portion 22a but it is not necessary that the first tube end portion 24a is permanently fixed to the first pipe end portion 22a. The first tube end portion 24a may be detachable from the first pipe end portion 22a. Similarly, the second tube end portion 24b may be detachable from the second pipe end portion 22b. The flexible tube 20 itself may be detachable from the flexible pipe 18.

The first connection adapter 16a has the same structure as the second connection adapter 16b. In the following description, the first connection adapter 16a and the second connection adapter 16b will be collectively referred to as "connection adapter 16" for simplification. In addition, the first pipe end portion 22a has the same structure as the second pipe end portion 22b and the first tube end portion 24a has the same structure as the second tube end portion 24b. Therefore, as with the first connection adapter 16a and the second connection adapter 16b, the first pipe end portion 22a and the second pipe end portion 22b will be collectively referred to as "pipe end portion 22" and the first tube end portion 24a and the second tube end portion 24b will be collectively referred to as "tube end portion 24". Note that, as necessary, the first connection adapter 16a may have a structure different from that of the second connection adapter 16b.

Figure 2:
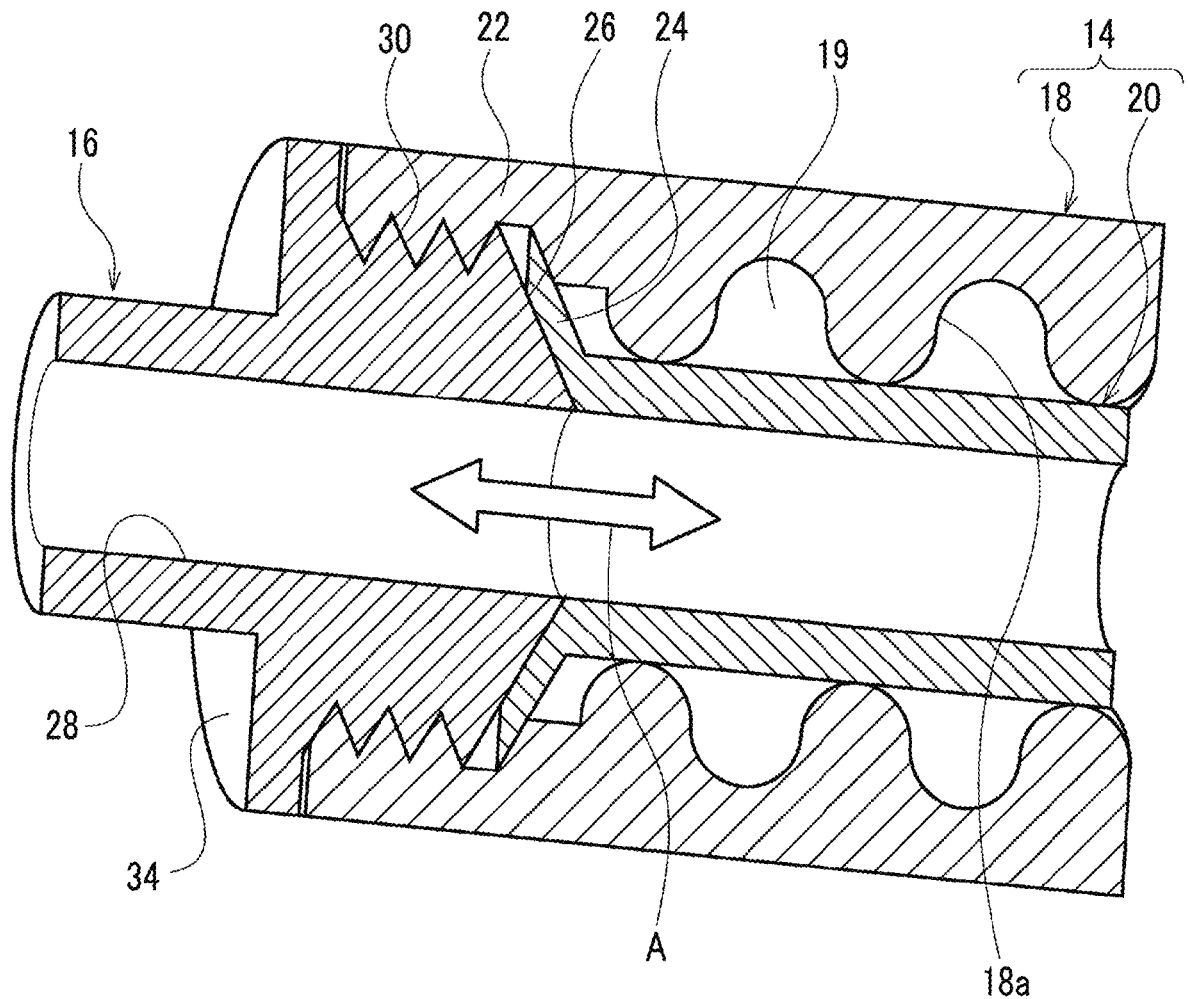
FIG. 2 is a view schematically illustrating a section of an end portion of a flexible connection pipe illustrated in FIG. 1.

FIG. 2 is a view schematically illustrating a section of an end portion of the flexible connection pipe 12 illustrated in FIG. 1. As described above, the connection adapter 16 is provided to connect the connection hose 14 to a constituent element of the cryocooler. The connection adapter 16 is adjacent to the tube end portion 24 and is fixed to the pipe end portion 22. The flexible pipe 18 is provided with a bellows-shaped pipe inner surface 18a and a cavity 19 is formed between the pipe inner surface 18a and the flexible tube 20.

The connection adapter 16 is provided with a tapered surface 26 that comes into contact with the tube end portion 24. The tube end portion 24 is interposed between the tapered surface 26 and the pipe end portion 22. The shape of the tube end portion 24 is changed from a cylindrical shape, which is the original shape of the tube end portion 24, to a conical shape or a flare shape which matches the shape of the tapered surface 26. In this manner, the tube end portion 24 comes into close contact with the pipe end portion 22.

The connection adapter 16 is provided with a through-hole 28 through which the gas flow path in the flexible tube 20 communicates with a working gas chamber in a cryocooler constituent element. Therefore, the working gas flows between the flexible tube 20 and the cryocooler constituent element through the through-hole 28 (arrow A).

In addition, the connection adapter 16 is configured as a plug member that closes an end portion of the connection hose 14. Therefore, the connection adapter 16 is provided with an outer surface that surrounds the through-hole 28 and a first screw portion 30 is formed on the outer surface. The above-described tapered surface 26 is formed at a position close to one end of the first screw portion 30 in a direction in which the through-hole 28 extends. A lid portion 34, which matches an end surface of the flexible pipe 18, is formed at a position close to the other end of the first screw portion 30. An inner surface of a tip end of the pipe end portion 22 is provided with a second screw portion that corresponds to the first screw portion 30. When the first screw portion 30 is screwed into the second screw portion, the connection adapter 16 is fixed to the connection hose 14. In addition, the tube end portion 24 is interposed between the tapered surface 26 and the pipe end portion 22 and the lid portion 34 comes into contact with the end surface of the flexible pipe 18.

Figure 3:
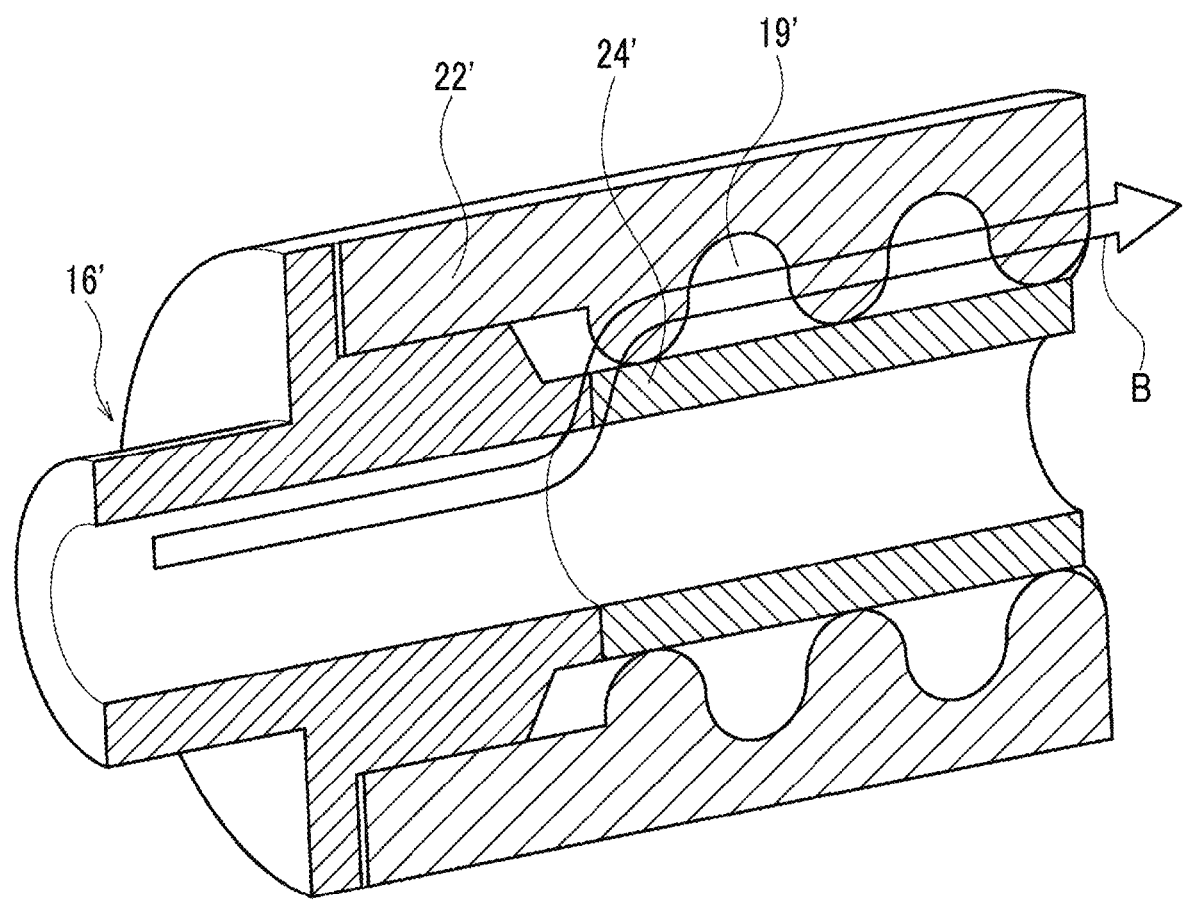
FIG. 3 is a view schematically illustrating a section of an end portion of a certain flexible pipe.

FIG. 3 is a view schematically illustrating a section of an end portion of a certain flexible pipe. As illustrated in FIG. 3, an end portion of a connection adapter 16' is adjacent to a tube end portion 24'. In this case, since the tube end portion 24' does not come into close contact with both of the connection adapter 16' and a pipe end portion 22', a working gas may leak into a cavity 19'. Particularly, when the flexible pipe is in a curved state, the tube end portion 24' may be separated from the connection adapter 16' near an outer circumferential side of the curve. In this case, a considerable amount of working gas leaks into the cavity 19' through a gap between the tube end portion 24' and the connection adapter 16'. The gas leaking into the cavity 19' at one end of the flexible pipe may flow up to the other end of the pipe. According to research performed by the present inventors, such a bypass stream B may influence a cooling performance. Particularly, in a case where the frequency of pressure vibration of the working gas is high (for example, approximately 60 Hz), the bypass stream B significantly decreases the cooling performance.

Meanwhile, according to the embodiment, since the tube end portion 24 comes into close contact with the pipe end portion 22 due to the connection adapter 16, the working gas can be prevented or restrained from leaking into the cavity 19 and the bypass stream can be suppressed. Particularly, not only when the connection hose 14 is in a straight state but also when the connection hose 14 is in a curved state, the working gas can be prevented or restrained from leaking into the cavity 19. Through an experiment, the present inventors verified that the embodiment results in the same level of cooling performance in comparison with a cryocooler in the related art for which a rigid connection pipe is used.

The flexible connection pipe 12 may have a configuration in which the pressure in the cavity 19 becomes lower than the pressure of the working gas in the flexible tube 20. In order to achieve the configuration as described above, the cavity 19 may be filled with a gas, of which the pressure is lower than the pressure of the working gas in the flexible tube 20, in advance. Since a cryocooler working pressure, that is, the pressure of the working gas in the flexible tube 20 is generally significantly higher than the atmospheric pressure, the cavity 19 may be filled with a gas, of which the pressure is equal to or lower than the atmospheric pressure, in advance. According to this configuration, the flexible tube 20 is expanded due to a difference between the pressure of the cryocooler working gas and the pressure in the cavity. Preferably, the flexible tube 20 may be pressed against the pipe inner surface 18a with the flexible tube 20. Therefore, the cavity 19 becomes narrow or the cavity 19 is blocked in the middle of the connection hose 14, and thus the bypass stream can be suppressed.

Figure 4:
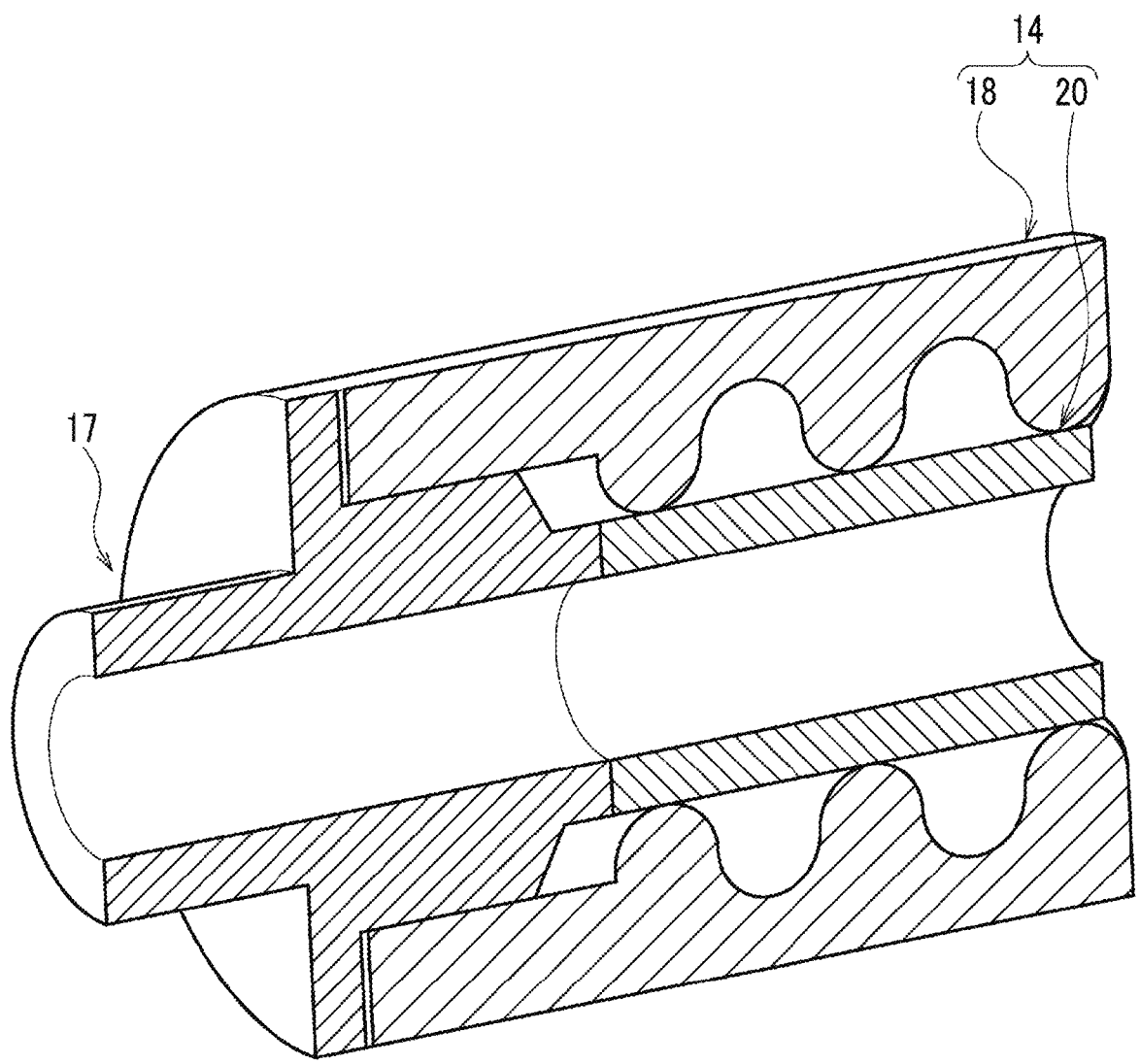
FIG. 4 is a view schematically illustrating a section of an end portion of a flexible connection pipe according to another embodiment.
Figure 5:
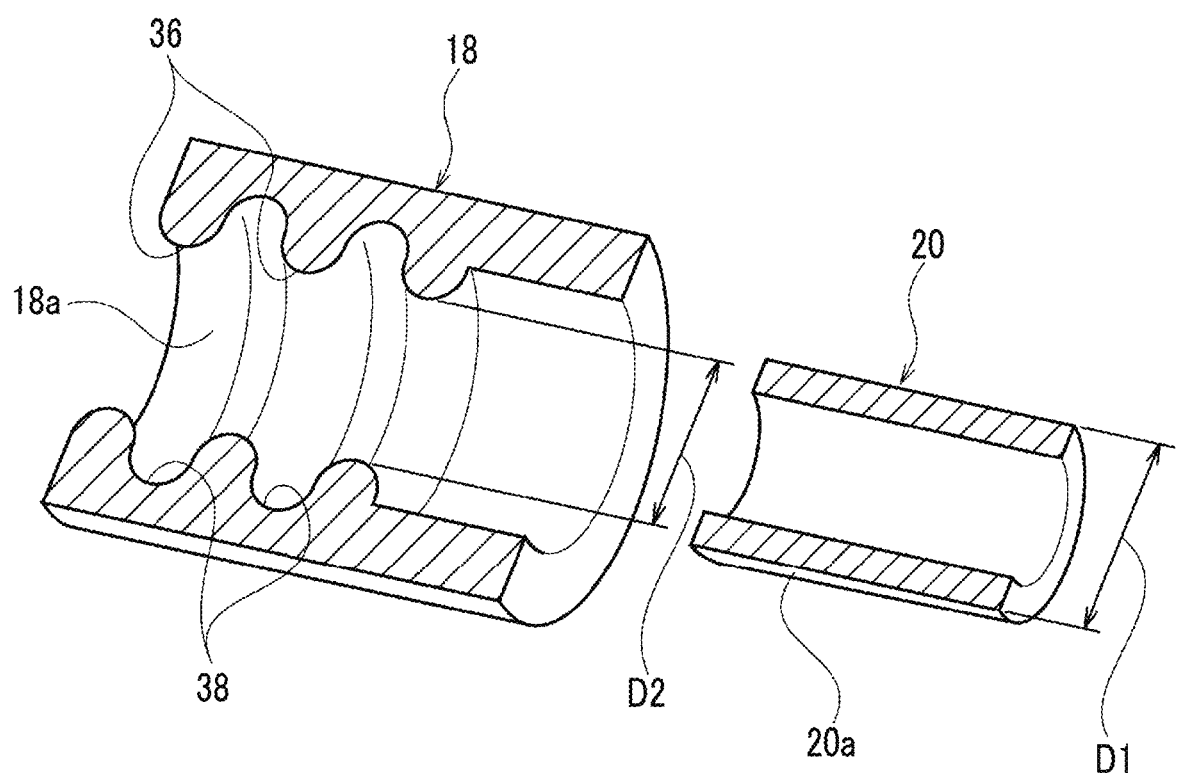
FIG. 5 is a schematic view for describing a dimensional relationship between a flexible pipe and a flexible tube which are illustrated in FIG. 4.

FIG. 4 is a view schematically illustrating a section of an end portion of the flexible connection pipe 12 according to another embodiment. FIG. 5 is a schematic view for describing a dimensional relationship between the flexible pipe 18 and the flexible tube 20 which are illustrated in FIG. 4. As described below, there may be another method of pressing the flexible tube 20 against the pipe inner surface 18a.

The pipe inner surface 18a is provided with a plurality of protruding portions 36 and a plurality of recess portions 38 that are alternately arranged and the pipe inner surface 18a is formed into a bellows-like shape due to the alternate arrangement. The flexible tube 20 is provided with a tube outer surface 20a that comes into contact with the plurality of protruding portions 36. The cavity 19 is formed between the plurality of recess portions 38 and the tube outer surface 20a. The plurality of protruding portions 36 may be a plurality of annular projections which are individually formed. Alternatively, the plurality of protruding portions 36 may be one continuous spiral projection.

An outer diameter D1 of the tube end portion 24 is larger than an inner diameter D2 of the pipe end portion 22. More specifically, the inner diameter D2 is an inner diameter at the protruding portion 36. Since the tube end portion 24 is thicker than the pipe end portion 22, when the flexible tube 20 is inserted into the flexible pipe 18, the tube end portion 24 is pressed against the pipe end portion 22. Even in this manner, it is possible to suppress the bypass stream.

It is desirable that a difference between the outer diameter D1 and the inner diameter D2 is small to such an extent that the flexible tube 20 can be inserted into the flexible pipe 18. Therefore, for example, the outer diameter D1 of the tube end portion 24 may be smaller than an inner diameter at the recess portion 38. Alternatively, the outer diameter D1 of the tube end portion 24 may be smaller than the average of the inner diameter at the protruding portion 36 and the inner diameter at the recess portion 38.

Such a dimensional relationship may also be applied to the entire hose instead of being applied only to the end portion of the connection hose 14. That is, the outer diameter D1 of the flexible tube 20 may be larger than the inner diameter of the protruding portion 36 of the pipe inner surface 18a and may be smaller than the inner diameter of the recess portion 38 or the average diameter of the pipe inner surface 18a.

The above-described dimensional relationship may also be applied to the embodiment of the connection adapter 16 with a tapered portion, which has been described with reference to FIG. 2.

Figure 6:
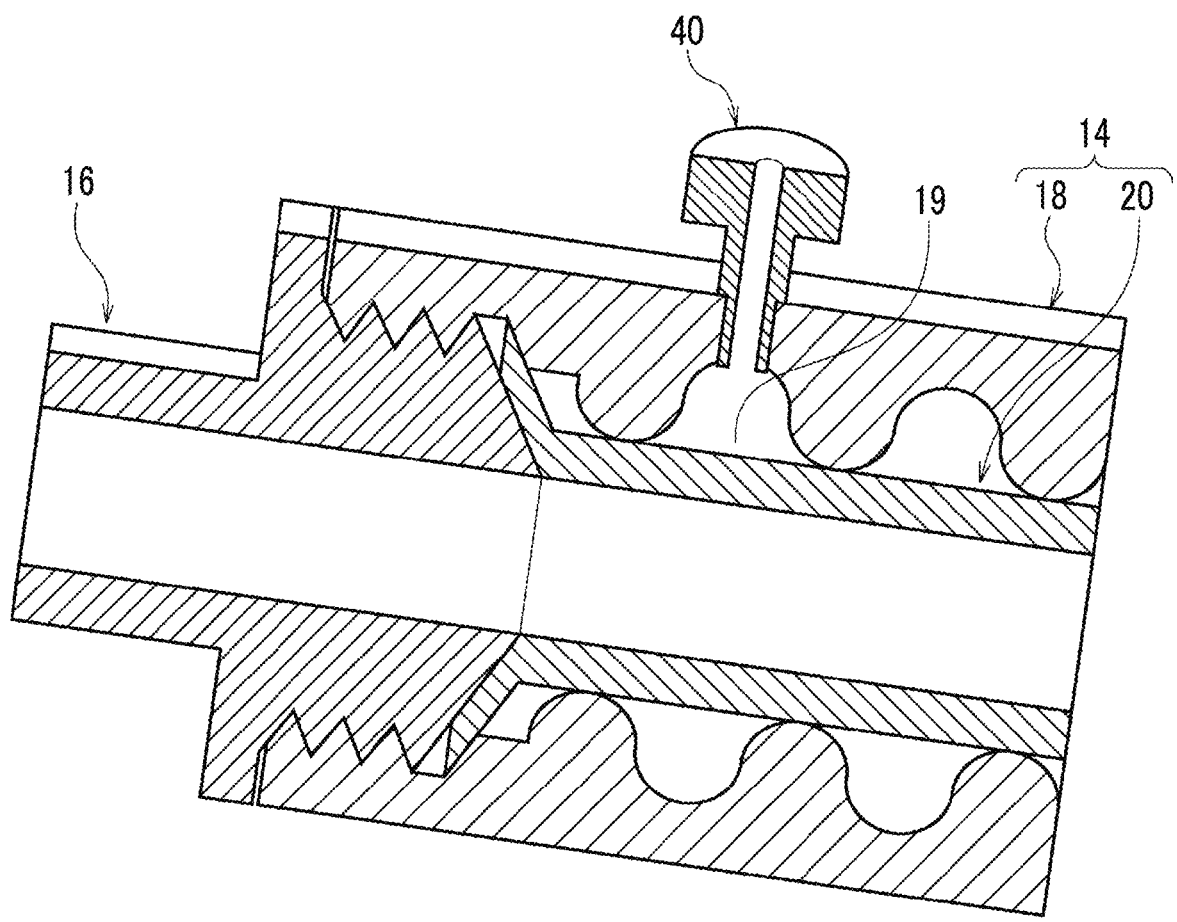
FIG. 6 is a view schematically illustrating a section of an end portion of a flexible connection pipe according to still another embodiment.

FIG. 6 is a view schematically illustrating a section of an end portion of the flexible connection pipe 12 according to still another embodiment. FIG. 6 illustrates an example of another configuration for maintaining the pressure in the cavity 19 to be lower than the cryocooler working pressure. The flexible connection pipe 12 is provided with a gas vent port 40 for discharging a gas from the cavity 19 to the outside of the connection hose 14 (that is, ambient environment). The gas vent port 40 is provided with a communication hole through which the cavity 19 communicates with the connection hose 14 and which can be opened and closed and a closing member that closes the communication hole. The closing member can be detached from the connection hose 14 in order to open or close the communication hole. In FIG. 6, the gas vent port 40 penetrates the connection hose 14 in a radial direction. However, in another embodiment, the gas vent port 40 may be provided along an axial direction such that the gas vent port 40 penetrates the connection adapter 16 and the connection hose 14.

It is possible to adjust the pressure in the cavity 19 to be the ambient pressure (for example, atmospheric pressure) by periodically opening the gas vent port 40. As described above, since the pressure in the tube is higher than the pressure in the cavity 19, it is possible to maintain the pressure in the cavity 19 at a low pressure. Alternatively, the gas vent port 40 may be connected to a vacuum pump or other vacuum source such that the cavity 19 is evacuated. Even in this manner, it is possible to suppress the bypass stream. In addition, since a residual gas in the cavity 19 can be discharged, it is possible to prevent a decrease in performance of the cryocooler caused by contamination.

The gas vent port 40 may also be applied to the embodiment of a connection adapter 17 without a tapered portion, which has been described with reference to FIGS. 4 and 5. In this case, in order to prevent the working gas from leaking into the cavity 19, a sealing member or a sealing mechanism may be provided between the connection adapter 17 and the flexible pipe 18 and/or between the flexible tube 20 and the flexible pipe 18.

Hereinabove, the embodiments of the invention have been described based on the examples. The present invention is not limited to the embodiments and it will be understood by those skilled in the art that various design changes can be made, various modification examples can be implemented, and the modification examples are also fall within the scope of the invention.

For example, the flexible connection pipe 12 can also be applied not only for a stirling cryocooler but for another cryocooler.

Figure 7:
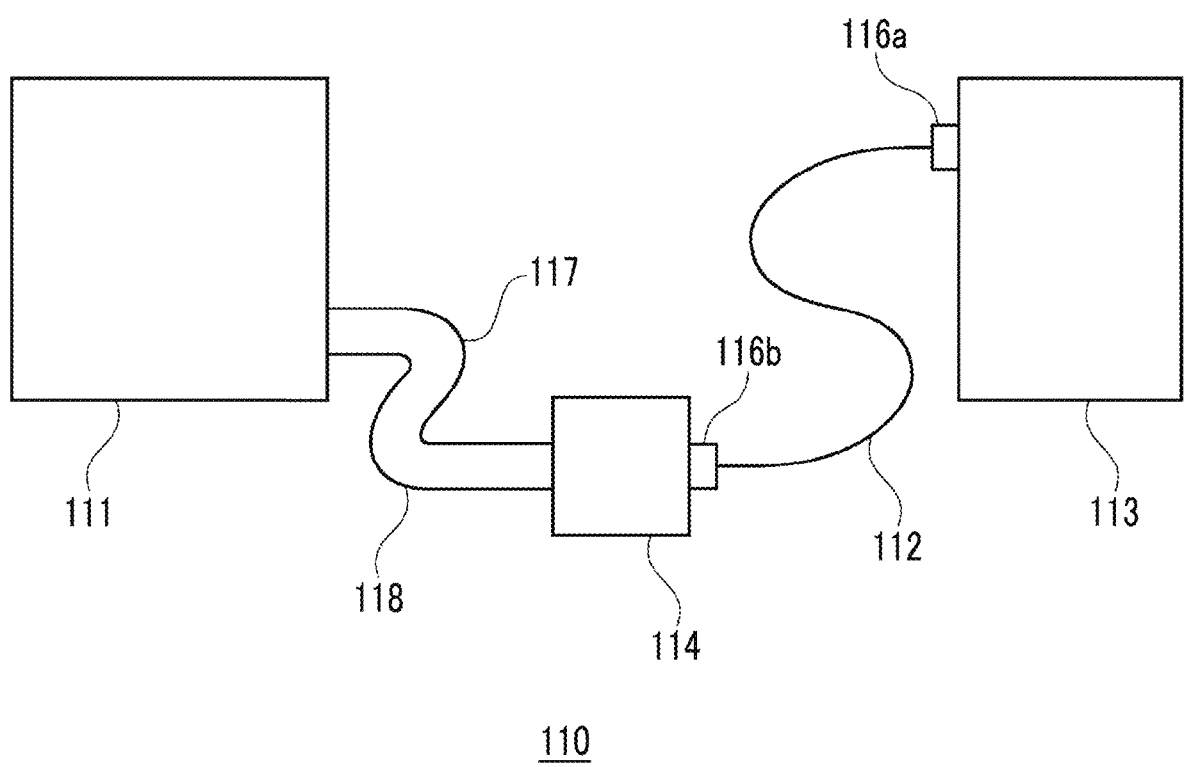
FIG. 7 is a view schematically illustrating the entire configuration of a cryocooler according to a still another embodiment.

FIG. 7 is a view schematically illustrating the entire configuration of a cryocooler 110 according to a still another embodiment. The cryocooler 110 is provided with a compressor 111, a cold head 113, and a valve unit 114. The valve unit 114 is disposed to be separated from the cold head 113. The cryocooler 110 may be a pulse tube cryocooler. A flexible connection pipe 112, which may have the same configuration as the flexible connection pipe 12, connects the valve unit 114 to the cold head 113. The flexible connection pipe 112 may be provided with a first connection adapter 116a connected to the cold head 113 and a second connection adapter 116b connected to the valve unit 114. The flexible connection pipe 12 may be used as a high-pressure pipe 117 that connects a discharge port of the compressor 111 to the valve unit 114 and/or a low-pressure pipe 118 that connects the valve unit 114 to a suction port of the compressor 111.

Figure 8:
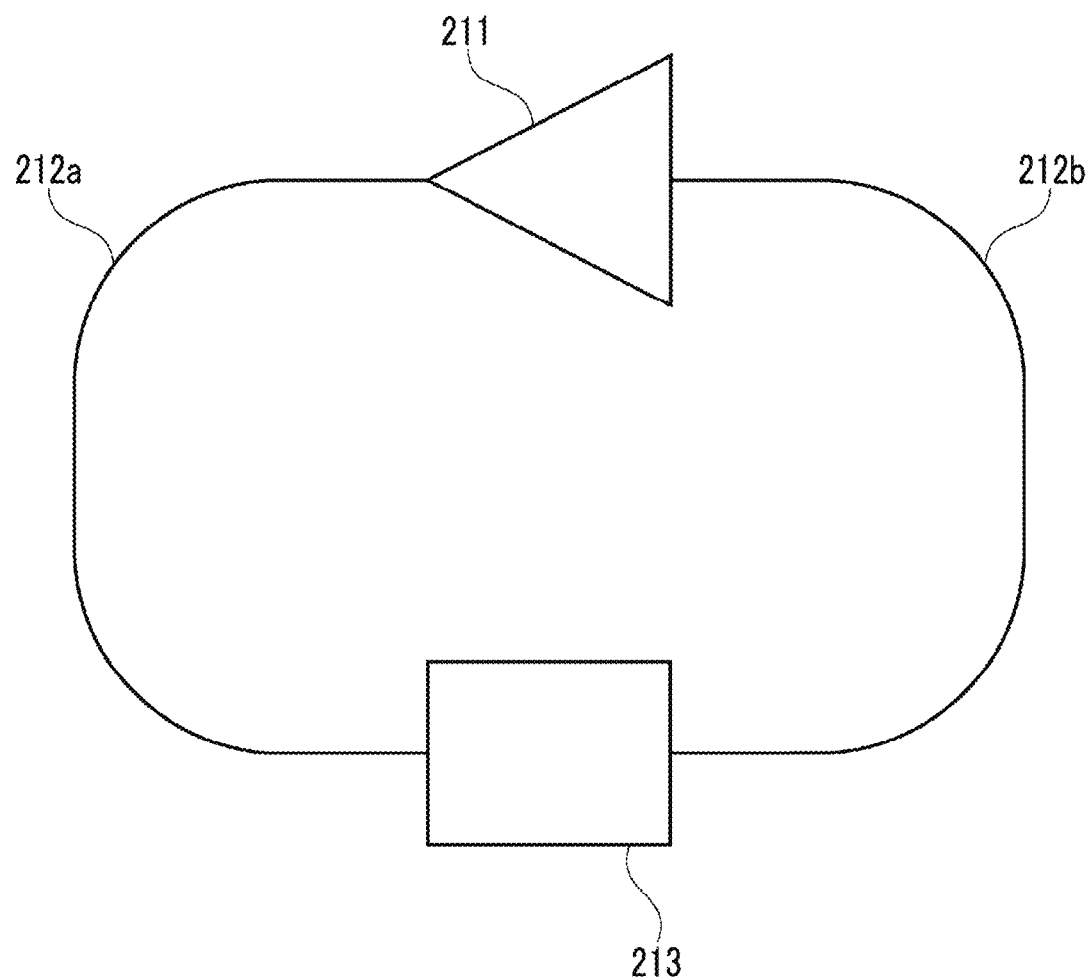
FIG. 8 is a view schematically illustrating the entire configuration of a cryocooler according to a still another embodiment.

FIG. 8 is a view schematically illustrating the entire configuration of a cryocooler 210 according to a still another embodiment. The cryocooler 210 is provided with a compressor 211 and an expander 213. The cryocooler 210 may be a Gifford-MacMahon cryocooler. The cryocooler 210 is provided with a first flexible connection pipe 212a as a high-pressure pipe that connects a discharge port of the compressor 211 to the expander 213 and a second flexible connection pipe 212b as a low-pressure pipe that connects the expander 213 to a suction port of the compressor 211. The flexible connection pipe 12 may be used as the first flexible connection pipe 212a and/or the second flexible connection pipe 212b.

The embodiments of the invention can be utilized in the field of cryocoolers.

It should be understood that the invention is not limited to the above-described embodiment, but may be modified into various forms on the basis of the spirit of the invention. Additionally, the modifications are included in the scope of the invention.

What is claimed is:

1. A flexible connection pipe for a cryocooler comprising:
a connection hose that comprises:
a flexible pipe which is provided with a pipe end portion, and
a flexible tube provided with a tube end portion coming into close contact with the pipe end portion and being inserted into the flexible pipe; and
a connection adapter that is configured to connect the connection hose to a constituent element of the cryocooler,
wherein the connection adapter comprises:
a through-hole that is adjacent to the tube end portion and fixed to the pipe end portion,
an outer surface that surrounds the through-hole, and
a first screw portion is formed on the outer surface,
wherein an inner surface of a tip end of the pipe end portion is provided with a second screw portion that corresponds to the first screw portion,
wherein the first screw portion is screwable into the second screw portion in a manner that fixes the connection adapter onto the connection hose,
wherein the flexible pipe comprises a bellows-shape inner surface provided with a plurality of protruding portions and a plurality of recess portions arranged alternately, and
wherein the flexible tube comprises a tube outer surface that comes into contact with the plurality of protruding portions, and the connection hose is provided with a cavity that is formed between the plurality of recess portions and the tube outer surface.

2. The flexible connection pipe for a cryocooler according to claim 1,
wherein the connection adapter is provided with a tapered surface on one end thereof that comes into contact with the tube end portion, and the tube end portion is interposed between the tapered surface and the pipe end portion.

3. The flexible connection pipe for a cryocooler according to claim 2,
wherein the connection adapter is configured as a plug member which closes an end portion of the connection hose, and is provided with a lid portion on the other end thereof that comes into contact with an end surface of the flexible pipe.

4. The flexible connection pipe for a cryocooler according to claim 1,
wherein the outer diameter of the tube end portion is larger than the inner diameter of the pipe end portion.

5. The flexible connection pipe according to claim 1, the constituent element is one of a compressor, an expander, a cold head or a valve unit.

6. The flexible connection pipe for a cryocooler according to claim 1,
wherein a pressure of a gas in the cavity is lower than a pressure of a working gas in the flexible tube.

7. The flexible connection pipe for a cryocooler according to claim 1,
wherein the plurality of protruding portions are a plurality of annular projections which are individually formed or one continuous spiral projection.

8. The flexible connection pipe for a cryocooler according to claim 1,
wherein the flexible connection pipe is provided with a gas vent port for discharging a gas from the cavity to the outside of the connection hose.

9. A cryocooler comprising the flexible connection pipe according to claim 1, further comprising:
a compressor, an expander, a cold head or a valve unit; wherein
the connection adapter connects the connection hose to the compressor, the expander, the cold head or the valve unit.

10. A cryocooler comprising:
a compressor;
an expander that is disposed to be separated from the compressor; and
a flexible connection pipe that is configured to connect the compressor to the expander, wherein the flexible connection pipe comprises:
a connection hose that includes a flexible pipe and a flexible tube, the flexible pipe being provided with a first pipe end portion and a second pipe end portion, the flexible tube being provided with a first tube end portion and a second tube end portion respectively coming into close contact with the first pipe end portion and the second pipe end portion and being inserted into the flexible pipe,
a first connection adapter that is configured to connect the connection hose to the compressor, the first connection adapter including a through-hole, being adjacent to the first tube end portion, and being fixed to the first pipe end portion, and
a second connection adapter that is configured to connect the connection hose to the expander, the second connection adapter including a through-hole, being adjacent to the second tube end portion, and being fixed to the second pipe end portion,
wherein each of the first connection adapter and the second connection adapter comprises an outer surface that surrounds the through-hole, and a first screw portion is formed on the outer surface,
wherein an inner surface of a tip end of the pipe end portion is provided with a second screw portion that corresponds to the first screw portion,
wherein the first screw portion is screwable into the second screw portion in a manner that fixes the connection adapter onto the connection hose;
wherein the flexible pipe comprises a bellows-shape inner surface provided with a plurality of protruding portions and a plurality of recess portions arranged alternately, and
wherein the flexible tube comprises a tube outer surface that comes into contact with the plurality of protruding portions, and the connection hose is provided with a cavity that is formed between the plurality of recess portions and the tube outer surface.

11. A cryocooler comprising:
a cold head;
a valve unit that is disposed to be separated from the cold head; and
a flexible connection pipe that is configured to connect the cold head to the valve unit,
wherein the flexible connection pipe comprises:
a connection hose that includes a flexible pipe and a flexible tube, the flexible pipe being provided with a first pipe end portion and a second pipe end portion, the flexible tube being provided with a first tube end portion and a second tube end portion respectively coming into close contact with the first pipe end portion and the second pipe end portion and being inserted into the flexible pipe,
a first connection adapter that is configured to connect the connection hose to the cold head, the first connection adapter including a through-hole, being adjacent to the first tube end portion, and being fixed to the first pipe end portion, and
a second connection adapter that is configured to connect the connection hose to the valve unit, the second connection adapter including a through-hole, being adjacent to the second tube end portion, and being fixed to the second pipe end portion,
wherein each of the first connection adapter and the second connection adapter comprises an outer surface that surrounds the through-hole, and a first screw portion is formed on the outer surface,
wherein an inner surface of a tip end of the pipe end portion is provided with a second screw portion that corresponds to the first screw portion,
wherein the first screw portion is screwable into the second screw portion in a manner that fixes the connection adapter onto the connection hose,
wherein the flexible pipe comprises a bellows-shape inner surface provided with a plurality of protruding portions and a plurality of recess portions arranged alternately, and
wherein the flexible tube comprises a tube outer surface that comes into contact with the plurality of protruding portions, and the connection hose is provided with a cavity that is formed between the plurality of recess portions and the tube outer surface.

* * * * *